United States Patent
Tenorio

(10) Patent No.: US 7,379,898 B2
(45) Date of Patent: May 27, 2008

(54) SYSTEM AND METHOD FOR GENERATING MARKET PRICING INFORMATION FOR NON-FUNGIBLE ITEMS

(75) Inventor: Manoel Tenorio, Mountain View, CA (US)

(73) Assignee: i2 Technologies US, Inc., Dallas, TX (US)

( * ) Notice: Subject to any disclaimer, the term of this patent is extended or adjusted under 35 U.S.C. 154(b) by 1194 days.

(21) Appl. No.: 09/745,979

(22) Filed: Dec. 22, 2000

(65) Prior Publication Data

US 2002/0082849 A1    Jun. 27, 2002

(51) Int. Cl.
*G06Q 20/00* (2006.01)

(52) U.S. Cl. .......................... 705/20; 705/10

(58) Field of Classification Search ................ 705/37, 705/70, 80, 10, 26, 35, 36, 20
See application file for complete search history.

(56) References Cited

U.S. PATENT DOCUMENTS

| | | | | | |
|---|---|---|---|---|---|
| 1,927,702 | A | * | 9/1933 | Foss | 705/36 |
| 3,581,072 | A | * | 5/1971 | Nymeyer | 705/37 |
| 5,063,506 | A | * | 11/1991 | Brockwell et al. | 705/7 |
| 5,117,354 | A | * | 5/1992 | Long et al. | 705/27 |
| 5,172,314 | A | * | 12/1992 | Poland et al. | 705/1 |
| 5,249,120 | A | * | 9/1993 | Foley | 705/1 |
| 5,873,069 | A | * | 2/1999 | Reuhl et al. | 705/20 |
| 5,987,435 | A | * | 11/1999 | Weiss et al. | 705/36 |
| 6,415,268 | B1 | * | 7/2002 | Korisch | 705/36 |
| 6,513,020 | B1 | * | 1/2003 | Weiss et al. | 705/36 |
| 2001/0032116 | A1 | * | 10/2001 | Hyatt | 705/10 |
| 2002/0013749 | A1 | * | 1/2002 | Ricciardi | 705/35 |
| 2002/0082881 | A1 | * | 6/2002 | Price et al. | 705/7 |
| 2002/0099596 | A1 | * | 7/2002 | Geraghty | 705/10 |
| 2002/0099636 | A1 | * | 7/2002 | Narumo | 705/36 |
| 2002/0161853 | A1 | * | 10/2002 | Burak et al. | 709/218 |
| 2002/0169703 | A1 | * | 11/2002 | Lutnick et al. | 705/37 |
| 2003/0018561 | A1 | * | 1/2003 | Kitchen et al. | 705/37 |
| 2003/0149636 | A1 | * | 8/2003 | Lutnick et al. | 705/26 |

* cited by examiner

*Primary Examiner*—R. Weisberger
(74) *Attorney, Agent, or Firm*—Booth Udall, PLC

(57) ABSTRACT

A system for generating market pricing information for a non-fungible target item includes one or more databases containing historical pricing information for at least one reference item, historical pricing information for at least the target item, and market pricing information for at least the reference item. A pricing engine determines a pricing differential between the target item and the reference item that reflects historical pricing information for the target and reference items. The pricing engine applies the pricing differential to the market pricing information for the reference item to generate market pricing information for the target item. The market pricing information for the reference item may include a substantially real-time current market price for the reference item, and the market pricing information for the target item may be generated in the form of a substantially real-time current market price quote for the target item for communication to a market participant.

28 Claims, 2 Drawing Sheets

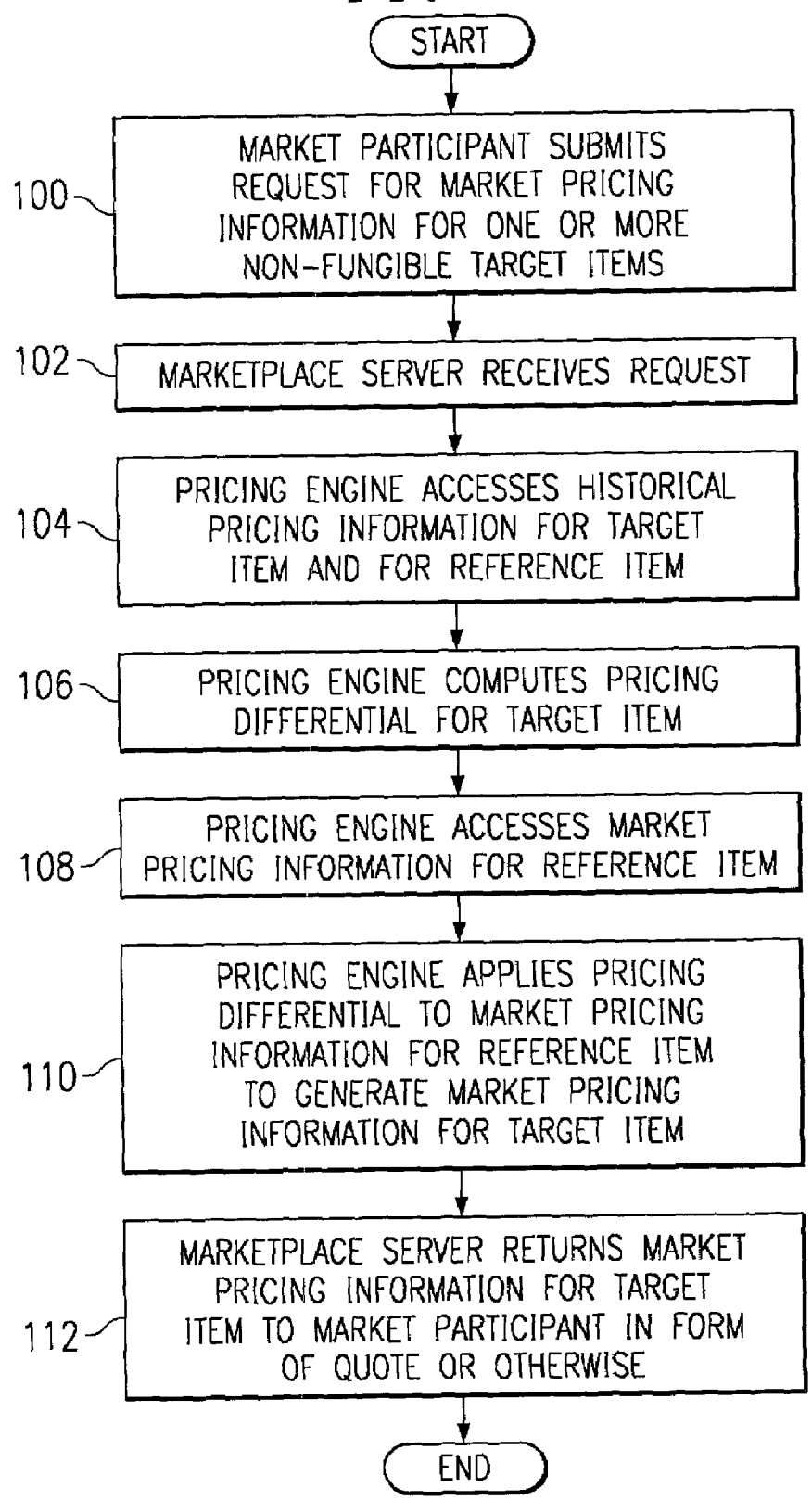

SYSTEM AND METHOD FOR GENERATING MARKET PRICING INFORMATION FOR NON-FUNGIBLE ITEMS

TECHNICAL FIELD OF THE INVENTION

This invention relates generally to the field of electronic commerce, and more particularly to a system and method for generating market pricing information for non-fungible items.

BACKGROUND OF THE INVENTION

In general, commodity items are fungible in that market participants will freely exchange one such item for another such item, since any differences between the two items are immaterial. As just an example, shares of a particular stock are fungible, since participants will (transactions costs, tax consequences, and other ancillary issues aside) sell and later repurchase a number of shares without regard to the identity of the actual shares being traded. In contrast, non-commodity items are non-fungible in that market participants will not freely exchange one such item for another, since the differences between the two items are material. For example, houses are non-fungible. Even two houses with identical structures, appearances, and lot sizes generally cannot be entirely equivalent, since they must necessarily have different locations.

Where considerations external to the actual identity of items make otherwise fungible items non-fungible, the considerations may be normalized to make such items essentially fungible as quasi-commodities. As an example, although sugar is inherently fungible as an item, two shipments of sugar delivered on different days and at different locations will generally not be treated identically in the marketplace. By normalizing according to the delivery date and location, however, the sugar may be made fungible since shipments of sugar delivered on the same day and at the same location will be treated identically in the marketplace.

A difficulty in marketplaces in which non-fungible items are traded is lack of liquidity with respect to these non-fungible items. For example, in a marketplace for component parts used in manufacturing, there may be a large number of parts available for purchase but a very low trading volume for at least some of the parts (typically the parts that are non-fungible). If the last trade involving a particular part occurred three months ago, and market conditions have changed appreciably in the interim, how are market participants to determine a current fair market price for the part? Inability to readily determine fair market pricing information for non-fungible items may prevent sellers of such items from providing meaningful and substantially real-time quotes to buyers, erode confidence of buyers in the market for such items, and otherwise inhibit trading with respect to such items. As a result of any of these or other disadvantages, prior pricing techniques for non-fungible items have been inadequate in many electronic marketplace and other electronic commerce environments.

SUMMARY OF THE INVENTION

According to the present invention, problems and disadvantages associated with previous pricing techniques for non-fungible items have been substantially reduced or eliminated.

According to one embodiment of the present invention, a system for generating market pricing information for a non-fungible target item includes one or more databases containing historical pricing information for at least one reference item, historical pricing information for at least the target item, and market pricing information for at least the reference item. The system further includes a pricing engine that determines a pricing differential between the target item and the reference item which reflects the historical pricing information for the target and reference items. The pricing engine accesses the market pricing information for the reference item and applies the pricing differential to that market pricing information to generate market pricing information for the target item. In a more particular embodiment, the market pricing information for the reference item includes a substantially real-time current market price for the reference item, and the market pricing information for the target item is generated in the form of a substantially real-time current market price quote for the target item for communication to a market participant. In another more particular embodiment, the reference item is substantially fungible and serves as a proxy for price elasticity within at least the portion of a market that includes the target and reference items.

The present invention provides a number of technical advantages over previous techniques. The present invention allows sellers of non-fungible items to more readily generate market pricing information for the items, in the form of substantially real-time market price quotes or otherwise, to improve liquidity and thus provide more efficient commerce with respect to such items. Non-fungible items, for which there might be a small market individually, can be grouped together to form a larger live market against which quotes for the non-fungible items may be obtained. Even where the last actual trade of a non-fungible item occurred some time ago, several months ago for example, daily or even more real-time market price quotes can be readily generated for the non-fungible item. Moreover, the present invention helps increase the confidence of buyers of non-fungible items in the fairness and uniformity of pricing for the items and in the market as a whole. Furthermore, the present invention allows buyers to manage risks associated with price fluctuations and make more fully informed decisions about when and with whom to trade.

Systems and methods that incorporate one or more of these or other advantages are well suited for electronic commercial environments, such as those associated with Internet-accessible websites or marketplaces providing bid-ask exchanges. Still other technical advantages are readily apparent to those skilled in the art from the following figures, descriptions, and claims.

BRIEF DESCRIPTION OF THE DRAWINGS

To provide a more complete understanding of the present invention and features and advantages thereof, reference is made to the following description in conjunction with the accompanying drawings, in which:

FIG. 3 illustrates an exemplary method for the generation of market pricing information for one or more non-fungible items.

DETAILED DESCRIPTION OF THE INVENTION

Figure 1:
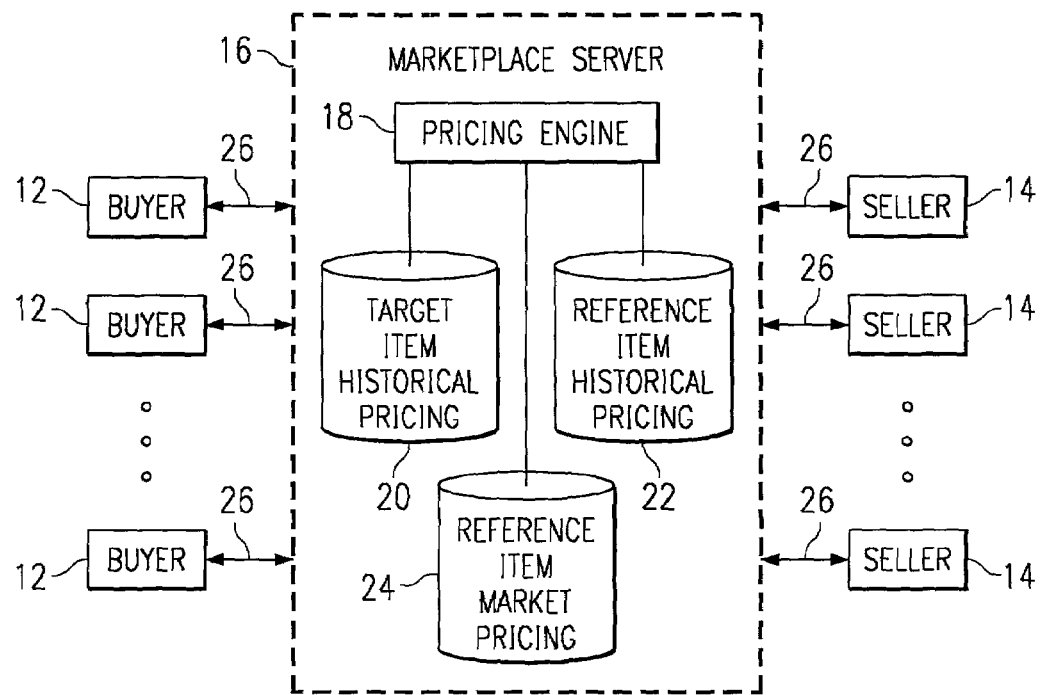
FIG. 1 illustrates an exemplary system for the generation of market pricing information for one or more non-fungible items.

FIG. 1 illustrates an exemplary system 10 used to generate market pricing information for non-fungible items. System 10 includes one or more buyers 12, one or more sellers 14, and at least one marketplace server 16 associated with a website, an electronic marketplace providing a bid-ask exchange, or another environment accessible to buyers 12 and sellers 14. In one embodiment, the marketplace server 16 receives a request for quote (RFQ) with respect to a non-fungible item from a buyer 12 and then generates a substantially real-time market price quote for the item, on behalf of a seller 14. To generate market pricing information for the non-fungible item, in the form of a quote or otherwise, the marketplace server 16 uses an associated pricing engine 18 to compute or otherwise determine a pricing differential between the non-fungible item (referred to as the target item) and a substantially fungible or other suitable reference item. Pricing engine 18 applies the determined pricing differential to market pricing information for the reference item to generate the market pricing information for the target item.

Buyers 12 may be any appropriate entities that access marketplace server 16, autonomously or relying upon input from associated persons, to receive market pricing information concerning one or more non-fungible items in connection with prospective purchases or otherwise. Sellers 14 may be any suitable entities that offer non-fungible items for sale according to market pricing information generated at marketplace server 16. A seller 14 may be willing to sell a non-fungible item at the quoted market price reflected in the market pricing information or may offer the item for sale at a different price, for example, at an ask price that incorporates a spread or mark-up. Similarly, a buyer 12 may be willing to purchase a non-fungible item at the quoted market price reflected in the market pricing information or may offer to purchase the item at a bid price different than the market price. Buyers 12, sellers 14, and marketplace server 16 may be coupled to one another using links 26 that each include one or more local area networks (LANs), metropolitan area networks (MANs), wide area networks (WANs), a portion of the global computer network known as the Internet, or any other appropriate wireline, wireless, or other links. The components of the marketplace server 16 may operate on one or more computers at one or more locations. Although the marketplace server 16 is described primarily as being separate from buyers 12 and sellers 14, the marketplace server 16 may share one or more computer or other appropriate resources with one or more buyers 12 or sellers 14 according to particular needs. Furthermore, although the generation of market pricing information is described as occurring at the marketplace server 16, the present invention contemplates market pricing information being generated for one or more non-fungible items using a pricing engine associated with buyer 12, seller 14, or any other suitable location.

A request for market pricing information for a non-fungible item may occur in any suitable manner. For example, a buyer 12 may be a consumer who generates and submits a request to a business-to-consumer ("B2C") website that is associated with marketplace server 16 to obtain pricing information for a non-fungible retail item the consumer is interested in purchasing. Alternatively, a buyer 12 may be a procurement manager or autonomous procurement process within an enterprise that generates and submits RFQs for non-fungible parts needed to manufacture products to a business-to-business ("B2B") electronic marketplace that supports a bid-ask exchange. As another alternative, a seller 14 might generate and submit periodic requests for market pricing information for a non-fungible product for purposes of updating its product catalog to reflect changing market conditions. The present invention contemplates a request for market pricing information for a non-fungible item being made in any suitable manner, and for any suitable purpose.

Figure 2:
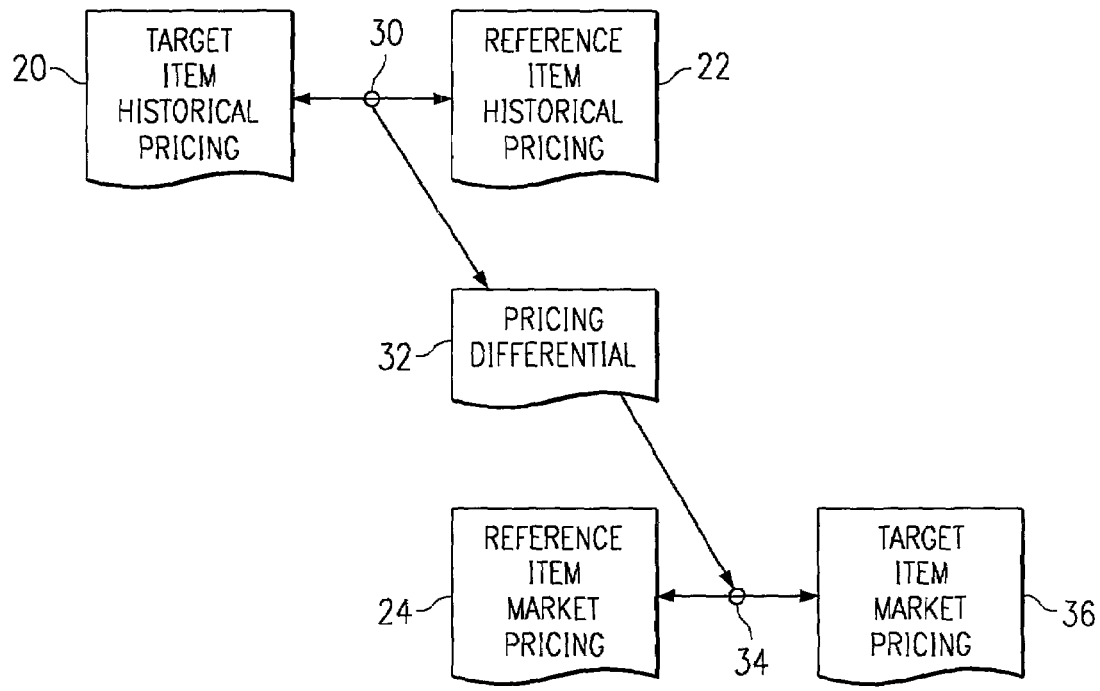
FIG. 2 illustrates exemplary application of a pricing differential to market pricing information for a reference item to generate market pricing information for a non-fungible item.

Associated with marketplace server 16 are one or more databases that contain historical pricing information 20 for one or more non-fungible target items, historical pricing information 22 for one or more substantially fungible reference items, and market pricing information 24 for the one or more reference items. Using this information, in response to an RFQ or other suitable request, marketplace server 16 generates market pricing information for a non-fungible target item as illustrated in FIG. 2. In one embodiment, using pricing engine 18 or otherwise, marketplace server 16 first accesses the historical pricing information 20 for the target item and 22 for a suitable reference item in the same market as the target item.

A relevant market may include a relatively large number of non-fungible items that are not widely available and are traded only rarely, and a much smaller number of substantially fungible items that are much more widely available and are traded much more frequently. In one embodiment, a reference item is selected for the market (or at least for a portion of the market including the non-fungible item) because the reference item has proven to be sufficiently fungible, having sufficient volume and liquidity, to serve as an indicator of price elasticity in the market (or relevant portion thereof). The reference item preferably serves as a proxy for changing market conditions that would affect the market price of all items within the market, including the target item. As an example, the market price of plastic parts may be primarily determined by the cost to manufacturers of the oil from which raw plastic is derived and the cost of time in an appropriate piece of equipment to place the raw plastic in its final saleable form. If a sufficiently fungible plastic part is selected as a reference item, changes in the market price for the reference item are likely to indicate corresponding changes in the market price of other plastic parts, including plastic parts that are non-fungible or are at least much less fungible than the reference item.

For example only, and not by way of limitation, it might be determined that a particular substantially fungible plastic part has historically required raw plastic worth one cent and equipment time worth five cents, totaling six cents in manufacturing costs (excluding labor, inventory, distribution, and other costs that in this particular example are approximately equal for all plastic parts in the market). It may also be determined that a particular non-fungible plastic part has historically required raw plastic worth two cents and equipment time worth ten cents, totaling twelve cents in manufacturing costs (again excluding costs that are approximately equal for all plastic parts in the market). Therefore, in this particular example, market participants can reasonably agree that the market price of the non-fungible part should be twice the market price of the fungible part based on their relative manufacturing costs. The market price of the non-fungible item can therefore be normalized to the fluctuating market price of the reference item. The relationship between the target and reference items may be reflected in a pricing differential computed for the target item relative to the reference item, which may be expressed as a difference, as a percentage, as another function, or in any other suitable manner. Accordingly, if the market price of the reference item increases to eight cents based on changing market conditions, the market price for the target item may in this example be quoted as increasing to sixteen cents (twice eight cents), without regard to actual current or even recent market pricing information for the target item, which in many cases may be unavailable due to the relatively low volume of market activity for the target item.

Marketplace server 16 may select a reference item from among a collection of multiple possible reference items based on the particular target item for which market pricing information is sought. This might be desirable where different reference items have been determined to be especially correlative of market price as to different sets of target items within the relevant market.

Although the target and reference items are described primarily as being parts, components, products, or other tangible items, the present invention may be applied in the context of services, real property, contracts or other legal instruments, or any other suitable items according to particular needs. As just an example, assume a simple will that many lawyers routinely prepare, without noticeable variation in content or quality, may be considered fungible and has historically cost approximately $1,000. This price reflects the underlying value of lawyer time, the primary indicator of market price for legal instruments. Further assume a particular type of complex business agreement, which only a few lawyers are able to prepare and is prepared only relatively rarely, has historically cost approximately $5,000 —five times as much as the simple will and thus presumably requiring five times the lawyer time to prepare. If the market price of the simple will increases to approximately $2,000 in a survey of recent transactions, it is reasonable to presume that the market price for the complex business agreement will similarly increase to approximately $10,000. The present invention may be used to generate market pricing information for non-fungible legal instruments in the manner described herein. Of course, there is generally no guarantee that a particular buyer 12 (here, the client) will actually be able to obtain a non-fungible item (here, the complex business agreement) from a particular seller 14 (here, the lawyer) at the quoted market price. However, buyer 12 is able to readily evaluate the actual price in the context of a reasonable determination of fair market price.

In one embodiment, historical pricing information 20 and 22 may reflect the actual sales prices of target and reference items, respectively, over a time period. For example, the historical pricing information 20 and 22 might be in the form of median sales prices of the target and reference items, respectively, over the time period. As an alternative, historical pricing information 20 and 22 may reflect quoted prices for the target and reference items, respectively, over the time period. As another alternative, historical pricing information 20 and 22 may reflect bid-ask spreads for the target and reference items, respectively, over the time period. The present invention contemplates any historical pricing information 20 and 22, whether generated within the electronic marketplace or other environment associated with marketplace server 16 or generated externally and imported into that environment.

Pricing engine 18 compares historical pricing information 20 for the target item with historical pricing information 22 for the reference item (as indicated at reference numeral 30) to generate a pricing differential 32 for the target item. Pricing engine 18 applies pricing differential 32 to market pricing information 24 for the reference item (as indicated at reference numeral 34) to generate the requested market pricing information 36 for the target item.

In one embodiment, pricing engine 18 may compute pricing differential 32 as a difference, a percentage, as another function, or based on any other relationship between historical pricing information 20 for the target item and historical pricing information 22 for the reference item. For example and without limitation, the pricing differential 32 might be computed as a median, mean, or other price difference between the bid, ask, quoted, sales, or other prices for the target and reference items over a time period. The price difference might then be added to a corresponding measure of price reflected in market pricing information 24 for the reference item to generate the requested market pricing information 36 for the target item. As another example, pricing differential 32 might be computed as a percentage or other function of the bid, ask, quoted, sales, or other price for the reference item over the time period. Any suitable measure of price reflected in market pricing information 24 for the reference item may be multiplied by this percentage, or any other function otherwise applied, to generate the market pricing information 36 for the target item. The pricing differential 32 may be determined and applied to market pricing information 24 for the reference item in any suitable manner. Pricing engine 18 may merely access, as opposed to computing, pricing differential 32 where a previously computed pricing differential 32 is available and considered to be suitable for use.

As described above, market pricing information 24 to which pricing differential 32 is applied may be in the form of a current bid, ask, quoted, sales, or any other market price for the reference item, obtained in substantially real-time or in any other suitable manner. Alternatively, market pricing information 24 may be in the form of a forecast market price for the reference item. Market pricing information 36 for the target item may be generated according to any suitable current, forecast, or combined current and forecast market pricing information 24 for the reference item, according to particular needs. As an example, if appropriate, forecast market pricing information 36 for the target item might be generated according to an appropriate combination of current and forecast market pricing information 24 for the reference item.

Although a comparison between historical pricing information 20 for the target item with historical pricing information 22 for a single reference item is described, the present invention contemplates comparing historical pricing information 20 for the target item with historical pricing information 22 for multiple reference items in determining pricing differential 32 for the target item. For example, where two reference items are each determined to be representative of the price elasticity in the relevant market or portion thereof, it might be desirable to perform comparisons with each reference item and average or otherwise aggregate the results to yield a pricing differential 32 for the target item. Such reliance on multiple reference items may improve the reliability of market pricing information 36 generated for the target item.

In one embodiment, availability of substantially real-time market price quotes or other market pricing information for a non-fungible item allows a buyer 12 to manage risks associated with price fluctuations involving the item. For example, if there are increases in underlying cost factors responsible for price elasticity in the market, there may be a time lag between the impact of the increases on the price of a substantially fungible reference item and the impact of the increases on the price of a non-fungible target item. By studying price movements of the reference item, a buyer 12 using the present invention may be better able to predict price movements of the target item and manage their risk accordingly. If the price of the target item is expected to increase, buyer 12 might choose to purchase additional quantities of the target item before this increase takes effect, based on its measurement of market sentiment. Similarly, if the price of the target item is expected to decrease, buyer 12 may opt to delay purchasing quantities of the target item until after the decrease has taken effect. Normalizing the pricing of non-fungible items across the market to the price of a substantially fungible reference item may further hedge the risk of estimating prices throughout the market, similar to the lowering of risk resulting from diversification of investments.

FIG. 3 illustrates an exemplary method for the generation of market pricing information 36 for one or more non-fungible items. The method begins at step 100, where buyer 12, seller 14, or another market participant submits a request for market pricing information 36 for a non-fungible target item. Marketplace server 16 receives this request at step 102 and then, at step 104, accesses historical pricing information 20 for the target item and historical pricing information 22 for one or more substantially fungible reference items. At step 106, the pricing engine 18 of marketplace server 16 computes a pricing differential 32 for the target item according to the historical pricing information 20 and 22. As described above, rather than computing pricing differential 32, pricing engine 18 may access a previously computed pricing differential 32 where appropriate. At step 108, pricing engine 18 accesses market pricing information 24 for the reference item. As described above, market pricing information 24 may include a substantially real-time market price for the reference item. Pricing engine 18 applies pricing differential 32 to market pricing information 24 for the reference item, at step 110, to generate the requested market pricing information 36 for the target item. The marketplace server 16 returns market pricing information 36 to the requesting market participant at step 112, in the form of a substantially real-time market price quote or otherwise, to allow the market participant make purchasing or other suitable decisions concerning the target item.

Although the present invention has been described with several embodiments, a plethora of changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. An electronic marketplace computer system for generating market pricing information for one or more non-fungible target items, the system comprising:
   a marketplace server capable of receiving a request from a market participant for market pricing information for the one or more non-fungible target items, the marketplace server comprising:
      a pricing engine operable to:
         access one or more databases associated with the marketplace server containing:
            historical pricing information for one or more reference items;
            historical pricing information for the one or more non-fungible target items; and
            market pricing information for the one or more reference items;
         determine a pricing differential for the one or more non-fungible target items, the pricing differential reflecting the historical pricing information for the one or more non-fungible target items and the one or more reference items;
         apply the pricing differential to the market pricing information for the one or more reference items to generate the market pricing information for the one or more non-fungible target items; and
         communicate the generated market pricing information for the one or more non-fungible target items to the market participant.

2. The system of claim 1, wherein the market pricing information for the one or more reference items comprises a substantially real-time current market price for the one or more reference items.

3. The system of claim 1, wherein the one or more reference items is a fungible item that serves as a proxy for price elasticity in at least a portion of a market that includes the one or more non-fungible target items and the one or more reference items.

4. The system of claim 1, wherein the one or more reference items is a fungible item that serves as a proxy for at least one indicator of price for the target item, the indicator being selected from the group consisting of:
   cost per unit quantity of material used in creating the item;
   time associated with one or more pieces of equipment used in creating the item; and
   cost associated with one or more pieces of equipment used in creating the item;
   time associated with one or more persons involved in creating the item; and
   cost associated with one or more persons involved in creating the item.

5. The system of claim 1, wherein the pricing engine computes the pricing differential in a manner selected from the group consisting of:
   as a difference between one or more historical prices of the one or more non-fungible target items and one or more historical prices of the one or more reference items; and
   as a percentage of the historical price of the one or more reference items.

6. The system of claim 1, wherein the pricing engine accesses a previously computed pricing differential from among a collection of such pricing differentials to determine the pricing differential that is applied.

7. The system of claim 1, wherein the one or more non-fungible target items are selected from the group consisting of:
   a part;
   a component;
   a product;
   a service;
   real property; and
   a contract.

8. The system of claim 1, wherein the one or more non-fungible target items are made more fungible, with improved liquidity, through generation of the market pricing information for the one or more non-fungible target items.

9. The system of claim 1, wherein the pricing engine provides a bid-ask exchange with respect to a market that includes the one or more non-fungible target items and the one or more reference items.

10. Software for generating market pricing information for one or more a non-fungible target items, the software being embodied in a computer-readable medium and, when executed using one or more computer systems operable to:
- receive a request from a market participant for market pricing information for the one or more non-fungible target items;
- access historical pricing information for one or more reference items;
- access historical pricing information for the one or more non-fungible target items;
- access market pricing information for the one or more reference items;
- determine a pricing differential for the one or more non-fungible target items, the pricing differential reflecting stored historical pricing information for the one or more non-fungible target items and the one or more reference items;
- apply the pricing differential to the accessed market pricing information for the one or more reference items to generate the market pricing information for the one or more non-fungible target items; and
- communicate the generated market pricing information for the one or more non-fungible target items to the market participant.

11. The software of claim 10, wherein the market pricing information for the one or more reference items comprises a substantially real-time current market price for the one or more reference items.

12. The software of claim 10, wherein the one or more reference items is a fungible item that serves as a proxy for price elasticity in at least a portion of a market that includes the one or more non-fungible target items and the one or more reference items.

13. The software of claim 10, wherein the one or more reference items is a fungible item that serves as a proxy for at least one indicator of price for the target item, the indicator being selected from the group consisting of:
- cost per unit quantity of material used in creating the item;
- time associated with one or more pieces of equipment used in creating the item; and
- cost associated with one or more pieces of equipment used in creating the item;
- time associated with one or more persons involved in creating the item; and
- cost associated with one or more persons involved in creating the item.

14. The software of claim 10, operable to compute the pricing differential in a manner selected from the group consisting of:
- as a difference between one or more historical prices of the one or more non-fungible target items and one or more historical prices of the one or more reference items; and
- as a percentage of the historical price of the one or more reference items.

15. The software of claim 10, operable to access a previously computed pricing differential from among a collection of such pricing differentials to determine the pricing differential that is applied.

16. The software of claim 10, wherein the one or more non-fungible target items are selected from the group consisting of:
- a part;
- a component;
- a product;
- a service;
- real property; and
- a contract.

17. The software of claim 10, wherein the one or more non-fungible target items are made more fungible, with improved liquidity, through generation of the market pricing information for the one or more non-fungible target items.

18. The software of claim 10, wherein the software provides a bid-ask exchange with respect to a market that includes the one or more non-fungible target items and the one or more reference items.

19. A system for generating market pricing information for a non-fungible item, comprising:
- means for storing:
  - historical pricing information for at least one reference item;
  - historical pricing information for at least one non-fungible target item; and market pricing information for at least the reference item; and
- means for determining a pricing differential between the non-fungible target item and the reference item, the pricing differential reflecting the historical pricing information for the non-fungible target and reference items;
- means for accessing the market pricing information for the reference item; and
- means for applying the pricing differential to the market pricing information for the reference item to generate market pricing information for the non-fungible target item.

20. A computer-implemented method of generating market pricing information for one or more non-fungible target items, comprising:
- receiving a request from a market participant for market pricing information for the one or more non-fungible target items;
- accessing historical pricing information for one or more reference items;
- accessing historical pricing information for the one or more non-fungible target items;
- accessing market pricing information for the one or more reference items;
- determining a pricing differential for the one or more non-fungible target items, the pricing differential reflecting stored historical pricing information for the one or more non-fungible target items and the one or more reference items;
- applying the pricing differential to the accessed market pricing information for the one or more reference items to generate the market pricing information for the one or more non-fungible target items; and
- communicating the generated market pricing information for the one or more non-fungible target items to the market participant.

21. The method of claim 20, wherein the market pricing information for the one or more reference items comprises a substantially real-time current market price for the one or more reference items.

22. The method of claim 20, wherein the one or more reference items is a fungible item that serves as a proxy for price elasticity in at least a portion of a market that includes the one or more non-fungible target items and the one or more reference items.

23. The method of claim 20, wherein the one or more reference items is a fungible item that serves as a proxy for at least one indicator of price for the target item, the indicator being selected from the group consisting of:
- cost per unit quantity of material used in creating the item;
- time associated with one or more pieces of equipment used in creating the item; and cost associated with one or more pieces of equipment used in creating the item;

time associated with one or more persons involved in creating the item; and cost associated with one or more persons involved in creating the item.

24. The method of claim 20, wherein the pricing differential is computed in a manner selected from the group consisting of:

as a difference between one or more historical prices of the one or more non-fungible target items and one or more historical prices of the one or more reference items; and as a percentage of the historical price of the one or more reference items.

25. The method of claim 20, further comprising accessing a previously computed pricing differential from among a collection of such pricing differentials to determine the pricing differential that is applied.

26. The method of claim 20, wherein the one or more non-fungible target items are selected from the group consisting of:

a part;
a component;
a product;
a service;
real property; and
a contract.

27. The method of claim 20, wherein the one or more non-fungible target items are made more fungible, with improved liquidity, through generation of the market pricing information for the one or more non-fungible target items.

28. The method of claim 20, wherein the method provides a bid-ask exchange with respect to a market that includes the one or more non-fungible target items and the one or more reference items.

* * * * *